Nov. 16, 1954
F. DEBENHAM
2,694,634
MAKING MODELS IN RELIEF IN GELATINE
BY PHOTOGRAPHIC PROCESSES
Filed June 14, 1949
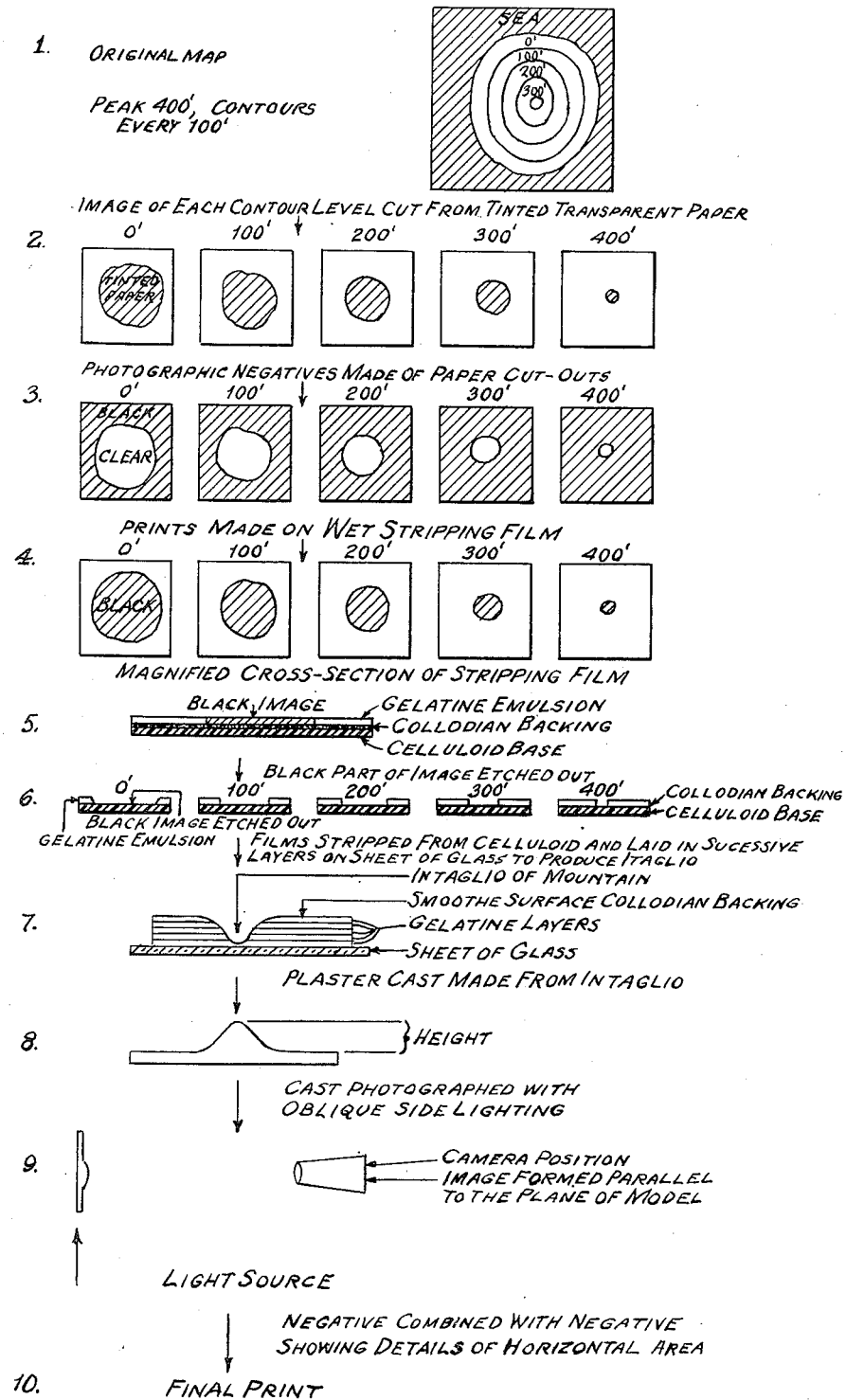

2,694,634

MAKING MODELS IN RELIEF IN GELATINE BY PHOTOGRAPHIC PROCESSES

Frank Debenham, Cambridge, England, assignor to Geographical Projects Ltd., London, England, a company of Great Britain Application June 14, 1949, Serial No. 99,124

Claims priority, application Great Britain November 15, 1948

5 Claims. (Cl. 95—5)

This invention relates to a method of photographically producing maps which show relief effects.

Individually, the principles applied in my method for making maps with relief effects have long been known, but so far as I am aware, I am the first to apply these principles, in combination, to produce maps. My process is well adapted to the mass production of maps which instantly and clearly convey even to the uninitiated the three-dimensional characteristics of a given terrain.

Broadly, my process involves preparing an image of each contour level of the terrain under study, which images are arrangeable in sequence and in register, then photographically preparing from these images a gelatine mold of the given terrain at the desired enlargement or reduction. A cast of the terrain is then made from the gelatine mold. The cast is photographed in oblique light to give a shadow photograph of the vertical dimension of the terrain; and the shadow photograph, together with a photograph showing details of the horizontal area such as rivers, roads, etc., is combined into a photographic map at the desired scale, showing horizontal detail in the usual way and vertical detail by shadows. This combined map may be reproduced by any suitable printing process.

My process will now be described in connection with the accompanying drawing which is a "flow diagram" representing successive steps of one specific embodiment of the invention selected by way of example.

The most generally convenient way known to me for utilizing my process is as follows:

A transparent masking material such as tinted tracing paper, tinted cellophane or the like is placed over a contour map of the given terrain. Registration marks are made so that this sheet can be registered with other like sheets. The area surrounded by a given contour is cut out with a small cutting wheel. The cut out portion is removed and the remaining area with its registration marks is photographed over a light background to the desired scale on stripping film, such as film having a gelatine-silver bromide emulsion on a collodion base which is backed by a regenerated cellulose or like flexible supporting film, slightly waxed to facilitate stripping of the emulsion and collodion base. Suitably polarized light is employed in obtaining the photograph on stripping film, and the camera is provided with an analyzer to eliminate glare. This process is carried out for a complete series of contours representing the vertical dimension of the given terrain.

When the terrain is low-lying and the contours are few and far apart, it is simple and convenient to form images on the stripping film of reduced horizontal scale and thus in effect to exaggerate the vertical scale which will finally be obtained. For example, negatives are produced for each of the cut out portions, these are placed in an enlarger and an image is projected onto the stripping film. In this way it is possible to produce an image of any convenient size and the horizontal scale may be varied to the extent desired.

The next step is to develop the stripping film and dip it in aqueous acetic acid, suitably of 20% strength, to act as a retarder during succeeding operations. The normal fixing procedure with thiosulphate is not employed. The stripping film is next immersed in an etch-bleach solution, for example a cupric chloride-hydrogen peroxide solution, until the silver image on the film has been bleached and the gelatine associated therewith has been softened. The softened gelatine is washed away, suitably with the aid of a piece of cotton wool, leaving a clear image of the particular contour area in all its details, surrounded by unaffected gelatine in which the remaining silver will eventually be deposited by the action of light.

Next, the gelatine and collodion base are stripped from the backing, starting with the sheet showing the highest contour level, and are laid down successively on a smooth base such as a glass plate, emulsion side down, and in register, and each is smoothed down against the one below, suitably with the aid of a chamois cloth, until it sticks to the sheet below. The very thin collodion backing to each sheet prevents displacement by the much thicker gelatine and also modifies the stepped effect.

The resulting structure is a gelatine model in intaglio of the given terrain. The trial collodion surface which is uppermost forms a smooth surface for casting. Moreover, this intaglio contains a deposit of silver in each layer of film, so that, if required, it can be used as a photographic "density negative" wherein the light transmission is proportional to contour level.

Casting is the next step of the process and may suitably be done in dental plaster or other fine-grained plaster which will not present surface imperfections even in an enlarged photograph. The cast is suitably dipped in hot wax and then polished, or varnished, or coated with a film of hard gelatine.

The finished cast is now photographed in oblique light to cast shadows of desired length to bring out the relief in the final photograph. Thus the camera is placed perpendicularly to the plane of the cast and the light is directed obliquely toward the cast at the angle selected to give the desired shadow length. This photograph may be made to any desired scale as by the use of a photographic enlarger-reducer and will preserve the ratio of vertical: horizontal scale of the cast. Thus whatever this ratio in the original contour map, it can be fixed at any desired value by the photographic processes employed in accordance with my invention.

The shadow photograph finally is combined with a photograph showing details of the horizontal area, in a single print, as by any of the known means for forming superposed prints, which will then show both horizontal area details such as roads, rivers, etc., and the vertical dimension of the terrain by shadows.

Instead of obtaining the images to be photographed onto stripping film by cutting them out in tinted transparent material, I may obtain them in a variety of other ways. For example, the contour lines at each contour level may be traced onto clear, transparent sheets, registration marks may be made, and the areas outside the contours on each sheet may be opaqued. The resulting images of each contour may be photographed against a light background as before. Of if the map maker's "pull" of the contour lines or contour areas are available, these may be photographed and the photographs may be opaqued as necessary to obtain the desired images to be photographed on stripping film. The above procedures are exemplary of preferred practice, but other methods of obtaining the desired negative images are not be considered as excluded.

An alternative to the etch-bleach process with stripping film to obtain the desired gelatine model photographically is use of the carbon process or the carbro (also called ozobrom) process for printing gelatine treated with dichromate solution (suitably potassium or sodium dichromate, or ammonium chromate or dichromate). For example, a gelatine model in intaglio may be obtained as follows. A series of negative photographic images of contour levels, or a series of cut out translucent or transparent tinted sheets such as used in the process described above, which series collectively represents the vertical dimension of the given terrain, is bound together in sequence and in register and is photographed against a light background. The result is a positive photographic image of the desired size in which the density of the deposit in any part of the image represents the contour level of the given terrain at that location; or, in other words, the light transmission through the image at any point is inversely proportional to the contour level of that point.

This positive may then be printed using the carbon process; e. g. printed on a gelatine-sugar or gelatine-glycerine coated film which has been soaked in cold aqueous potassium dichromate solution of 3–5% strength. Suitably a double or triple layer of gelatine (i. e. about 0.03–0.05 inch thick) on a clear support such as cellulose acetate or thin glass is employed and preferably the printing is done while the gelatine is still damp, to avoid curling. The positive is smoothed down in slightly damp condition against the back of the clear support and light is passed through the positive. The treated gelatine becomes water-insoluble in proportion to its exposure to light; that which is below the darkest areas of the positive is unaffected. The treatment is continued until insolubilization below clear regions of the positive has been effected through the full depth of the treated gelatine layer. When the exposed gelatine is washed in warm water, the gelatine which remains soluble is removed, leaving a low gelatine intaglio of the given terrain on the backing.

It is necessary to accentuate the intaglio for satisfactory casting. This may be accomplished by soaking say 24 hours in cold water, or in shorter time using warm water, or weakly acid or weakly alkaline solution, for example an aqueous ammonia solution of pH about 8. This operation increases the depth of the original intaglio by some 5-fold as a result of swelling of the gelatine. The gelatine mold may now be toughened by treatment with chrome alum solution, say 5 minutes soaking in 4% solution.

Gelatine swollen as above even if toughened is very tender and accordingly must be protected from the aqueous menstrum used with plaster for casting. I have found that a film of collodion over the gelatine mold serves the purpose. Such a film may be obtained by placing the mold under water with arrangements (wires or the like) for raising the mold out of water when desired. A drop or two of thin collodion solution is added and when the solution has spread over the surface of the water and just as it is beginning to set, the gelatine mold is slowly raised out of water. A water-impervious film of collodion is deposited over the surface of the gelatine mold.

A plaster cast may be made from this gelatine mold and the remaining operations may be carried out as has already been described.

As another specific example of photographically obtaining a gelatine mold of the given terrain, a method combining the use of the etch-bleach process with a bichromated gelatine process may be cited. In this method the cut out or negative photographic images of the given terrain are bound together in sequence and register and a photograph of the desired size is taken in double thickness silver bromide emulsion in gelatine on a glass backing. The photograph (a positive) is developed but not fixed.

Etch-bleach solution is then applied to this positive in the light and the action is continued until a negative relief (an intaglio) of the given terrain has been obtained. In this intaglio a further amount of silver deposit forms in the remaining gelatine as a result of the action of light on the emulsion, the amount of silver deposited being proportional to the thickness of gelatine remaining at any point. Thus there is obtained a density negative of the terrain, combined with a negative relief of the terrain.

After the density negative has been developed and fixed, a carbro process print is made from the density negative by squeegeeing, to the face of the negative, carbon tissue double coated with gelatine sensitized for carbro printing. Interaction between the deposit on the negative and the sensitized gelatine insolubilizes gelatine in proportion to the density of the silver deposit, i. e. in proportion to the degree of relief pre-existing in the density negative. The carbon tissue backing is then stripped off in warm water, and soluble gelatine is washed away, leaving an accentuated negative relief composed of gelatine of the silver bromide emulsion plus gelatine from the carbon tissue. This relief may be further accentuated by swelling in aqueous medium as previously described, and coated with collodion. It is used as a mold for a plaster cast and the process proceeds as before.

The above described specific embodiments of my invention illustrate preferred modes of obtaining photographically the desired gelatine mold, but are not the only ways in which it may be obtained inasmuch as modifications of the above will be evident to one skilled in the photographic art.

If desired, my final map may be prepared to show contour level by color as well as by shadow. For example, a density positive may be made, e. g. from a density negative obtained by the process of my invention as described above, and may be printed on the finished map in the color desired for high areas; and a density negative may similarly be printed in the color signifying low areas. The two combined on the final map will then shade into each other as the terrain alters from low to high. The printing in this modification of my process may be carried out by any convenient color printing means, as well known in the photographic art.

Where, in the above description of specific embodiments of my process, it is stated that negative images and gelatine intaglios are made, it is possible to make positives and gelatine reliefs by similar procedures, mutatis mutandis; but in general it is preferred to obtain a gelatine intaglio to be used as the mold for casting, rather than to obtain a gelatine relief.

What I claim and desire to secure by Letters Patent is:

1. A process for the production of maps showing details of both the horizontal and the vertical dimensions of a given terrain, which process comprises forming a separate image record on sheet material of the outline of each successive contour level of the terrain, said image records being dimensioned to be superposed in sequence and in register with one another, each of said image records having a light-contrast between areas above and areas below the contour level represented by the respective image record, photographically reproducing said image records on gelatine sheet material sensitized so that the solubility of the sheet varies with exposure to light, whereby the light-contrast of said image records is reproduced in solubility-contrast of said gelatine material, washing away the more soluble gelatine material while leaving the less soluble gelatine material to provide differences in thickness corresponding to said light-contrast, sheets representing the respective contours being superposed on one another in registration and in order to form a contoured surface that is an intaglio representation of the terrain, forming a cast of said contoured surface, photographing the cast with oblique lighting to produce a shadow photograph of the vertical dimension of the terrain, and combining this shadow photograph with a photograph showing details of the terrain in the horizontal dimensions to produce a print showing details of the terrain in the horizontal dimensions and details of the vertical dimension by shadows.

2. In a process of producing maps showing details of both the horizontal and the vertical dimensions of a terrain, the steps of providing a map showing successive contour levels, making a separate image record on sheet material of the outline of each of selected contour levels of the terrain, each of said image records having a light-contrast between areas above and areas below the contour level represented by the respective image record, photographically reproducing each of said image records on a sheet of gelatinous material sensitized so that the solubility of the gelatinous material varies with exposure to light, removing the more soluble gelatinous material so that the area of the gelatinous sheet on one side of the contour outline is thicker than on the opposite side, and superposing said gelatinous sheets in registration with one another to form a relief representation of said terrain.

3. In a process of producing maps showing details of both the horizontal and the vertical dimensions of a terrain, the steps of providing a map showing successive contour levels, making a separate image record on sheet material of the outline of each of selected contour levels of the terrain, each of said image records having a light-contrast between areas above and areas below the contour level represented by the respective image record, photographically reproducing each of said image records on a composite sheet comprising a thin flexible backing and a layer of gelatinous material sensitized so that the solubility of the gelatinous material varies with exposure to light, removing the more soluble portions of the gelatinous material so that the area of the composite sheet on one side of the contour outline is thicker than on the opposite side, and superposing said composite sheets in registration with one another to form a relief representation of said terrain.

4. In a process of producing maps showing details of both the horizontal and the vertical dimensions of a terrain, the steps of providing a map showing successive contour levels, making a separate image record on sheet material of the outline of each of selected contour levels of the terrain, each of said image records having a light-contrast between areas above and areas below the contour level represented by the respective image record, photographically reproducing each of said image records on a composite sheet comprising a supporting sheet, a thin flexible backing and a layer of gelatinous material sensitized so that the solubility of the gelatinous material varies with exposure to light, the exposure of said composite sheet being such that the gelatinous material in the area representing the map area above the respective contour level is rendered more soluble than that in the area representing the map area below said contour level, removing the more soluble portions of the gelatinous material and stripping the backing and attached layer of gelatinous material from the supporting sheet and superposing said backings with the attached gelatinous material in registration and in order, starting with the highest contour, the backings being placed with the gelatinous sides down, the superposed layers of gelatinous material forming an intaglio representation of the terrain and the backings tending to smooth out the steps presented by successive layers.

5. In a process of producing maps showing details of both the horizontal and the vertical dimensions of a terrain, the steps of providing a map showing successive contour levels, making an image record on sheet material of the outline of each of selected contour levels of the terrain, each of said image records having a light-contrast between areas above and areas below the contour level represented by the respective image record, photographically reproducing each of said image records on a composite sheet comprising a thin flexible backing and a layer of gelatinous material sensitized so that the solubility of the gelatinous material varies with exposure to light, the exposure of said composite sheet in making said photographic reproduction being such that the gelatinous material in the area representing the terrain area above the respective contour level is rendered more soluble than that in the area representing the terrain, removing the more soluble portions of the gelatinous material, superposing said composite sheets in registration with one another starting with the highest contour, the backing of said sheets being placed uppermost, the superposed layers of gelatinous material forming an intaglio representation of the terrain and the backing tending to smooth out the steps presented by successive layers.

References Cited in the file of this patent

UNITED STATES PATENTS

| Number | Name | Date |
|---|---|---|
| 584,552 | Jacobson | June 15, 1897 |
| 2,039,412 | Heise | May 5, 1936 |
| 2,069,647 | Tour | Feb. 2, 1937 |
| 2,151,817 | Wenschow | Mar. 28, 1939 |

FOREIGN PATENTS

| Number | Country | Date |
|---|---|---|
| 222,675 | Great Britain | Oct. 9, 1924 |
| 358,106 | Great Britain | Oct. 5, 1931 |